UNITED STATES PATENT OFFICE.

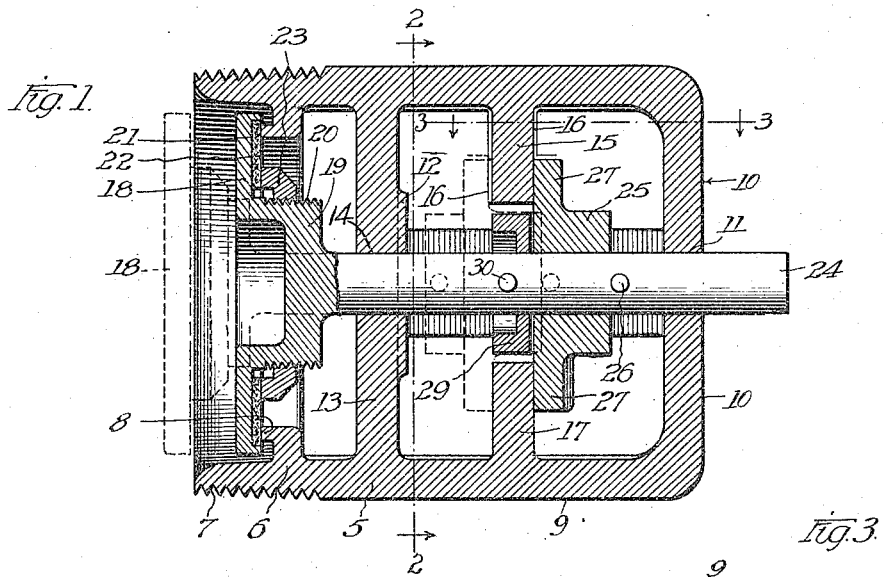
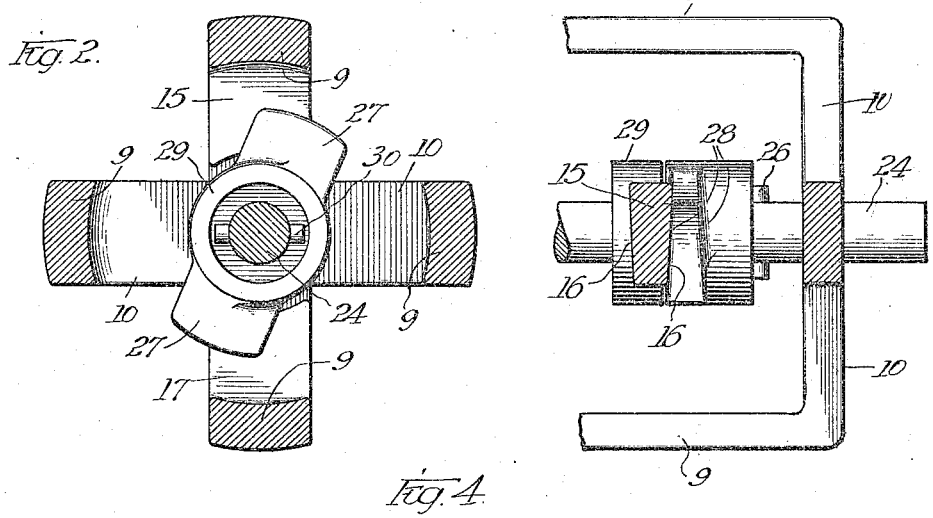
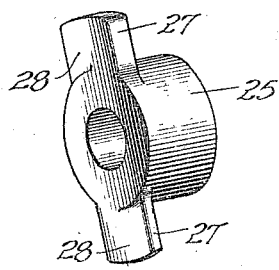

WILLIAM S. SUTTON, OF ROCKFORD, ILLINOIS, ASSIGNOR TO AMERICAN RADIATOR COMPANY, OF CHICAGO, ILLINOIS, A CORPORATION OF NEW JERSEY.

VALVE-LOCKING MECHANISM.

1,184,788.  Specification of Letters Patent.  Patented May 30, 1916.

Application filed August 19, 1914.  Serial No. 857,457.

*To all whom it may concern:*

Be it known that I, WILLIAM S. SUTTON, a resident of Rockford, in the county of Winnebago and State of Illinois, have invented certain new and useful Improvements in Valve-Locking Mechanism, of which the following is a specification.

My invention relates to a valve locking mechanism whereby a valve may be positively locked in either open or closed position.

My improved valve is particularly designed for use in connection with vacuum cleaning apparatus wherein it is desirable to have a valve that can be locked in open position when the vacuum cleaning apparatus is being used as a vacuum cleaner, and when the vacuum cleaning apparatus is converted into a blowing apparatus the valve herein described may be locked in closed position.

The principal objects of the invention are to provide a valve which is simple in construction; that may be readily and positively adjusted and which will not loosen under the normal vibration of the apparatus upon which it is designed to be used.

In the accompanying drawing: Figure 1 is a longitudinal sectional view of my improved valve locking mechanism. Fig. 2 is a section on the line 2—2 of Fig. 1 when the valve is in open position. Fig. 3 is a section on the line 3—3 of Fig. 1. Fig. 4 is a perspective view of the movable cam member on the valve stem.

Referring now more particularly to the drawing: The valve casing 5 comprises an annular end section 6 which is provided with suitable threads 7 whereby it may be secured to the apparatus upon which the valve is used. A valve seat 8 is formed integral with the casing near one end. The major portion of the valve casing is open, in the form of a frame, consisting preferably, of four webs of metal 9, the outer ends 10 of which project inwardly, meeting at a common point to form the bearing 11 for the valve stem hereinafter to be described. An annular section of metal 12 is supported centrally of the valve casing, preferably by four webs of metal 13, forming a bearing for the valve stem. A cam member or finger 15 is formed upon one of the webs 9, projecting inwardly relative to the casing and is provided with cam sides 16. A finger 17 is formed on a web 9 (preferably the web opposite to the web upon which the cam 15 is formed) and serves, in a measure, as a cam surface, although its sides do not converge as the cam surfaces on the cam member 15.

The valve consists of an annular head 18 provided with an integral boss 19, the periphery of which is provided with threads 20. The inner face of the head 18 is counter sunk, as shown at 21, to receive the leather or other soft form of washer or facing for the valve. The washer 22 is held against the face of the valve head 18 by means of the ring 23 which has a threaded engagement with the threads 20 of the boss 19. The valve stem 24, which is secured to the boss 19 in any suitable manner, is of sufficient length to project through the valve casing and has a bearing in the annular section of metal 12 through the opening 14 and in the bearing 11. Fixed to the valve stem 24 is a cam member or block 25 which is capable of rotating upon the valve stem but the pin 26 which passes through the valve stem prevents longitudinal movement of the cam block relative to the valve stem in one direction.

The cam member or block 25 is provided, preferably, with two cam fingers 27. The sides of each cam finger 27 converge to form cam surfaces but the cam surfaces on one finger 27 converge in a direction opposite to the cam surfaces on the other finger 27; the converging cam surfaces on one finger being clearly shown in Fig. 3 and designated by the numeral 28. The oppositely converging surfaces on the fingers 27 is best illustrated in Fig. 4.

Mounted upon the valve stem 24 and between the cam member 25 and the section of the metal 12, is a space block 29. A pin 30 passing through the valve stem 24 holds the space block 29 against the cam member 25 and also prevents longitudinal movement of the cam block relative to the stem; the function of the space block 29 being to limit the movement of the valve stem in one direction so that the cam surface upon one side of one of the fingers 27 of the cam member 25 will engage one of the cam surfaces on the cam member 15 when the cam member 25 is between the cam member 15 and the webs 13.

The device is operated as follows: When it is desired to hold the valve in closed position the cam member 25 may be engaged by the fingers of the operator and the valve stem moved so as to bring the valve into closed position, whereupon the cam member 25 is turned until one of the cam surfaces thereon wedges against the cam surface 16 on the cam member 15, as shown in Fig. 1. A slight amount of pressure upon the cam block 25 forces the two cam members together so that the valve head is tightly drawn against the valve seat 8. When it is desired to hold the valve in open position the cam member 25 is rotated upon the stem 24 until the fingers 27 are at substantially right angles to the fingers 15 and 17, whereupon the cam member 25 may be moved with the valve stem until the collar 29 strikes the section of metal 12. When the parts are in this position, by turning the cam member 25, the cam surface on one of the fingers 27 engages the cam surface 16 on the other side of the cam member 15, as shown in dotted lines in Fig. 1 whereupon the valve head is separated from the valve seat and the valve thus maintained in open position.

The operation is simple and effective, and since the operative mechanism is inclosed by the webs 9, there is little liability of accidental displacement of the cam members.

Having now described my invention I claim:

1. A valve locking mechanism comprising, a valve casing provided with a valve seat, a valve, a valve stem slidably connected to said casing, a stationary cam member on said casing, a cam member on said valve stem rotatably connected thereto, whereby the cam member on said valve stem may be positioned on opposite sides of the stationary cam member on said casing.

2. A valve locking mechanism comprising, a valve casing provided with a valve seat, a valve, a valve stem slidably connected to said casing, an inwardly projecting cam member on said casing and an outwardly projecting cam member rotatably mounted on said valve stem adapted to alternately engage opposite sides of the cam member on said casing, whereby said valve may be held in open or closed position.

In witness whereof, I hereunto subscribe my name this 15th day of August, A. D. 1914.

WILLIAM S. SUTTON.

Witnesses:
SADIE M. RYAN,
AVIS S. HERMMAN.